(12) United States Patent
Gebauer et al.

(10) Patent No.: US 12,407,228 B2
(45) Date of Patent: Sep. 2, 2025

(54) METHOD FOR PRODUCING A COMPONENT OF AN ELECTRIC MOTOR, ELECTRIC MOTOR COMPONENT AND ELECTRIC MOTOR

(71) Applicant: Schaeffler Technologies AG & Co. KG, Herzogenaurach (DE)

(72) Inventors: Peter Gebauer, Coburg (DE); Gregor Hullin, Erlangen (DE); Claus Schaeperkoetter, Erlangen (DE)

(73) Assignee: Schaeffler Technologies AG & Co. KG, Herzogenaurach (DE)

(\*) Notice: Subject to any disclaimer, the term of this patent is extended or adjusted under 35 U.S.C. 154(b) by 380 days.

(21) Appl. No.: 17/784,809

(22) PCT Filed: Jan. 12, 2021

(86) PCT No.: PCT/DE2021/100020
§ 371 (c)(1),
(2) Date: Jun. 13, 2022

(87) PCT Pub. No.: WO2021/148080
PCT Pub. Date: Jul. 29, 2021

(65) Prior Publication Data
US 2023/0021090 A1    Jan. 19, 2023

(30) Foreign Application Priority Data

Jan. 24, 2020   (DE) .................... 10 2020 101 670.0
Nov. 24, 2020  (DE) .................... 10 2020 130 987.2

(51) Int. Cl.
*H02K 15/02*    (2025.01)
*B22F 10/18*    (2021.01)
(Continued)

(52) U.S. Cl.
CPC ............. *H02K 15/02* (2013.01); *B22F 10/18* (2021.01); *B28B 1/001* (2013.01); *B33Y 10/00* (2014.12);
(Continued)

(58) Field of Classification Search
CPC ........ H02K 15/02; H02K 15/12; B22F 10/18; B22F 2301/35; B22F 2007/042;
(Continued)

(56) References Cited

U.S. PATENT DOCUMENTS

| 5,900,207 A | 5/1999 | Danforth et al. |
| 10,016,942 B2 | 7/2018 | Mark |

(Continued)

FOREIGN PATENT DOCUMENTS

| CN | 102282634 A | 12/2011 |
| CN | 106464062 A | 2/2017 |

(Continued)

OTHER PUBLICATIONS

Author: Joamin Gonzalez-Gutierrez et al Title: "Addictive Manufacturing of Metallic and Ceramic Components by Material Extrusion of Highly-Filled Polymers: A Review and Future Perspectives" Date: May 2018.

(Continued)

*Primary Examiner* — Rebecca Janssen
(74) *Attorney, Agent, or Firm* — Volpe Koenig

(57) ABSTRACT

A component, in particular a stator or a rotor, of an electric motor, in which a layer structure is generated is produced, using additive manufacturing, by:
  forming, via alternate additive production, a layer assembly having first layers and second layers, each first layer including a filament containing plastic and metal, and each second layer including a filament containing plastic and ceramic;

(Continued)

heating the layer assembly a first temperature, at which the plastic is removed from the layers;

further heating the layer assembly (2) to a second temperature, whereby the metal of the layer is sintered and an electrically insulating ceramic layer is obtained from the layer.

8 Claims, 3 Drawing Sheets

(51) Int. Cl.
  *B28B 1/00*     (2006.01)
  *B33Y 10/00*    (2015.01)
  *B33Y 80/00*    (2015.01)
  *C22C 38/02*    (2006.01)
  *C22C 38/06*    (2006.01)
  *H02K 15/12*    (2025.01)

(52) U.S. Cl.
  CPC .............. *B33Y 80/00* (2014.12); *C22C 38/02* (2013.01); *C22C 38/06* (2013.01); *H02K 15/12* (2013.01); *B22F 2301/35* (2013.01); *C22C 2202/02* (2013.01)

(58) Field of Classification Search
  CPC ...... B22F 2999/00; B22F 10/64; B28B 1/001; B33Y 10/00; B33Y 80/00; C22C 38/02; C22C 38/06; C22C 2202/02; C22C 33/0278; Y02P 10/25
  See application file for complete search history.

(56) References Cited

U.S. PATENT DOCUMENTS

| | | | |
|---|---|---|---|
| 2005/0133116 | A1 | 6/2005 | Yoshiaki et al. |
| 2011/0272622 | A1 | 11/2011 | Wakabayashi et al. |
| 2013/0112366 | A1 | 5/2013 | Mottin et al. |
| 2014/0265032 | A1 | 9/2014 | Teicher et al. |
| 2015/0006617 | A1 | 1/2015 | Yoo et al. |
| 2017/0297097 | A1 | 10/2017 | Gibson et al. |
| 2018/0236546 | A1 | 8/2018 | Mark |
| 2019/0341821 | A1* | 11/2019 | Johnson ............... H02K 1/02 |
| 2022/0278568 | A1* | 9/2022 | Ibrahim ............... B33Y 10/00 |

FOREIGN PATENT DOCUMENTS

| | | | | |
|---|---|---|---|---|
| CN | 108296602 | A | | 7/2018 |
| CN | 109804537 | A | | 5/2019 |
| CN | 110459376 | A | | 11/2019 |
| CN | 110474498 | A | | 11/2019 |
| DE | 102009013129 | A1 | | 9/2010 |
| DE | 102016119650 | A1 | | 4/2018 |
| DE | 102016119654 | A1 | | 4/2018 |
| DE | 102017003495 | A1 | * | 10/2018 |
| DE | 102017220735 | A1 | | 5/2019 |
| DE | 102017222635 | A1 | | 6/2019 |
| DE | 102018201622 | A1 | | 8/2019 |
| DE | 102018209553 | A1 | | 12/2019 |
| EP | 2509081 | A1 | | 10/2012 |
| EP | 3115132 | A1 | | 1/2017 |
| EP | 3255758 | A1 | | 12/2017 |
| EP | 3321002 | A1 | | 5/2018 |
| EP | 3444102 | A1 | | 2/2019 |
| EP | 3567700 | A1 | | 11/2019 |
| EP | 3595148 | A1 | | 1/2020 |
| KR | 20160092439 | A | | 8/2016 |
| WO | 2009039159 | A2 | | 3/2009 |
| WO | 2014072148 | A1 | | 5/2014 |
| WO | 2016146374 | A1 | | 9/2016 |
| WO | 2017123726 | A1 | | 7/2017 |
| WO | 2018102739 | A1 | | 6/2018 |
| WO | 2019022973 | A1 | | 1/2019 |
| WO | 2019047996 | A1 | | 3/2019 |
| WO | WO-2019226815 | A1 | * | 11/2019 ............. B22F 10/10 |
| WO | WO-2020126149 | A1 | * | 6/2020 |

OTHER PUBLICATIONS

Author: Levin, Merle Cornelia Source: "Characterization of soft magnetic Powder composites for use in traction drives" (Vollständig 3D-gedruckte geschaltete Reluktanzmaschine in Klauenpolausführung) Date: 2014.

Author: J. Rudolph et al.Title: "Fully 3D printed switched reluctance machine with claw pole design" (Vollständig 3D-gedruckte geschaltete Reluktanzmaschine in Klauenpolausführung) Date: 2019.

Author: Schaeffler Technologies AG and Co. KG Unpublished Application Specification: 10 2019 131 035.0 Date: Nov. 18, 2019 Country: Germany.

\* cited by examiner

METHOD FOR PRODUCING A COMPONENT OF AN ELECTRIC MOTOR, ELECTRIC MOTOR COMPONENT AND ELECTRIC MOTOR

CROSS-REFERENCE TO RELATED APPLICATIONS

This application is the U.S. National Phase of PCT Appln. No. PCT/DE2021/100020 filed Jan. 12, 2021, which claims priority to DE 102020130987.2 filed Nov. 24, 2020, which, in turn, claims priority to DE 102020101670.0 filed Jan. 24, 2020, the entire disclosures of which are incorporated by reference herein.

TECHNICAL FIELD

The disclosure relates to a method for producing a component, in particular a rotor or stator, of an electric motor. Furthermore, the disclosure relates to an electric motor component with a layer structure made up of layers of different composition and an electric motor.

BACKGROUND

DE 10 2016 119 650 A1 describes a method for producing a soft-magnetic core material for electrical machines and actuators, wherein the core material is built up from layers of different material components using additive manufacturing methods. In this case, a material component can have ceramic parts. A predominantly metallic material component can have a silicon content of 6.5% or more. Additive manufacturing should be possible using powdered starting materials. After shaping, the powder from the additive method can be partially blown out. With sintering, which is also mentioned in DE 10 2016 119 650 A1, the porosity of the workpiece, i.e., the component of an electrical machine, is intended to be minimized.

Another method for producing components of an electrical machine is disclosed in DE 10 2017 220 735 A1. In this case, individual sheet metal layers of a stator should be producible using a three-dimensional generative manufacturing method in such a way that no compressive or tensile stresses occur in angled areas of the sheet metal layers. The laser sintering method is mentioned as an example of a generative manufacturing method. Insulating foil or insulating varnish is suggested as the insulating material between the layers of sheet metal. Overall, the machine according to DE 10 2017 220 735 A1 is a transverse flux machine.

DE 10 2017 222 635 A1 describes a stator of an electric machine having a cooling system. In this case, the production of a cooling channel wall by an additive method is provided. An additional sealing of the cooling channel wall to a stator plate should thereby no longer be necessary.

A rotor for a reluctance machine is described in EP 3 255 758 A1, which is at least partially produced by additive manufacturing. Shapeless masses such as liquids or powder or shape-neutral materials such as tape or wire should be usable as starting materials for additive manufacturing. The finished rotor, which is manufactured using additive methods, has alternating conductor layers and insulating layers in the axial direction. Intermediate insulating bars should also be additively manufacturable.

WO 2019/022973 A1 deals with the additive manufacturing of vehicle components. Here, the use of the ADAM method (Atomic Diffusion Additive Manufacturing) is proposed. Typical of the ADAM method is the use of a starting material which contains metal and plastic, with the plastic being melted away. The remaining metal is densified by sintering.

Methods and devices for fiber-reinforced generative manufacturing are described, for example, in the documents WO 2017/123726 A1 and EP 3 444 102 A1.

A filament described in U.S. Pat. No. 10,016,942 B2, intended for use in an additive method, is said to be practically free of pores and to comprise a polymer which surrounds a multi-strand core.

WO 2018/102739 A1 explains options for sintering generatively manufactured parts with a densification linking platform.

In connection with additive manufacturing, US 2018/0236546 A1 proposes sintering at two temperature levels, with a first temperature level being 500 to 700 degrees Celsius and a second temperature level being 1000 to 1200 degrees Celsius.

A 3D printing method, which provides for the embedding of components in a 3D printing material, is disclosed in WO 2016/146374 A1. The embedded components can differ from the surrounding 3D printing material in terms of their thermal or magnetic properties.

Possibilities of producing coated filaments for extrusion-based 3D printing methods are described in WO 2014/072148 A1. It is provided here to coat filaments outside of the printer in a separate method.

Independent of additive manufacturing methods, electrical steel is often used to manufacture components for electrical machines. A paint-coated electrical strip described in DE 10 2018 209 553 A1 can have a total alloy content of silicon and aluminum of equal to or more than 1%, 2%, 3%, or 4%. The values 0.8%, 1.5%, 2%, and 3% are mentioned as possible silicon proportions.

Another electrical strip described in DE 10 2018 201 622 A1 has a silicon content of 2.3 to 2.7% and an aluminum content of 0.3 to 0.8%, each stated as a percentage by weight.

SUMMARY

The disclosure is based on further developing the manufacturing of components of electric motors, especially rotors and stators, compared with the stated prior art, from both the manufacturing technology and physical points of view of production engineering.

The electric motor component can be a stator or a rotor and, in the case of a linear motor, also a rotor. An electric motor can be a synchronous motor or an asynchronous motor. In the following, embodiments and advantages of the disclosure explained in connection with the electric motor component also apply analogously to the production method as well as the electric motor, and vice versa.

The electric motor component is manufactured in the following steps:

Different layers are produced additively in an alternating manner, namely a layer of a first type made of a filament containing plastic and metal, and a layer of a second type made of a filament containing plastic and ceramic.

The layer assembly produced in the first step is heated to a first temperature level at which plastic is removed from the layers, in particular by diffusion, the layer assembly is brought to a second increased temperature level, the metal of the first-type layer being sintered and an electrically insulating ceramic layer being obtained from the second-type layer.

The layers of the first type function in the finished electric motor component as magnetic flux-conducting layers, which are separated from one another by layers of the second type, the insulating layers. The various filaments from which the layers are built up are generally referred to as plastic/metal filament or plastic/ceramic filament, with the component of a filament referred to simply as "plastic" optionally containing other components. In any event, the filaments used to construct the layer assembly are thread-like in shape, and the diameter of the plastic/metal filament may differ from the diameter of the plastic/ceramic filament.

The thermal treatment of the entire layer assembly, which takes place after the complete assembly of the arrangement formed from the various layers, takes place while maintaining a defined temperature curve, with different method variants being possible. In any case, the plastic portion is at least largely removed from all layers—not necessarily at the same time—before the temperature is increased immediately afterwards or at any later time in such a way that sintering of the metal of the layer of the first type takes place and from the second layer a ceramic is created, likewise in a sintering process.

Overall, the filament-based generative manufacturing of the electric motor component, in particular the stator or rotor, leads to a layered structure in which the electrically and magnetically conductive layers, i.e., layers of the first type, are electrically isolated from one another by ceramic layers and are mechanically firmly connected to one another. By using filaments as precursor products, a significantly higher geometric precision can be achieved compared to powdered starting materials. The multi-stage heating of the layer assembly also ensures that the workpiece, i.e., the electric motor component to be produced, is already stabilized before sintering and undesirable effects, such as those caused by diffusion, are minimized. The thickness of each layer of the finished product, i.e., the component suitable for installation in an electric motor, can be adjusted as required and is, for example, not more than 0.15 mm.

According to one possible procedure, after the first temperature level has been reached, the workpiece is brought to an intermediate temperature level which is closer to the first temperature level than to the second temperature level, i.e., the temperature level selected for sintering. In other words: the first temperature level is split into two levels, which can be close to each other, but are clearly distinguishable from each other, and are set one after the other. The split temperature level applied prior to sintering has the effect of first changing only one of the layer types and then the other layer type. For example, the plastic portion of all layers of the first type is first removed, with the plastic portion of the layers of the second type not yet being affected at this point in time ensuring that the metallic components of all layers of the first type remain completely separate from one another. With the subsequent moderate increase in temperature to the intermediate level, there are practically no more changes in the layers of the first type. Rather, in this processing phase, the plastic is removed from the layer of the second type, and it is not disadvantageous if plastic partially gets into the layer of the first type.

The later sintering can take place after the previous treatment, i.e., the removal of plastic, has taken place either at a constant temperature level or at split levels. Sintering can also represent a process that is carried out either at a uniform temperature level or using different temperatures that are set one after the other. For example, a second temperature level is initially selected at which the sintering of the essentially metallic layer, i.e., layer of the first type, is completed. This can lead to a decrease in volume of the entire component. Since sintering does not yet take place in the ceramic components, i.e., within the layers of the second type, in this processing phase, the ceramic material adapts to the changes in dimensions of the metallic layers. Subsequently, a temperature level is set which is referred to as an elevated level, at which the sintering process in the layers of the second type is completed, i.e., the final ceramic layers are formed from these layers. The boundary surfaces between the metal and the ceramic layers are ultimately structured in such a way that there is a firm interlocking between the layers and no excessive fluctuations occur in the layer thicknesses.

Compared to the production of electric motor components from conventional electrical steel sheets, the electric motor component according to one exemplary embodiment of the disclosure has much greater freedom with regard to the composition of the layers. In particular, the metal is formed by an iron alloy containing more than 6.5% by weight silicon and aluminum in the range from 1 to 5% by weight. The silicon content is preferably in the range from greater than 6.5% by weight to 10% by weight. Such compositions of the metal used can only be used at all through the use of a generative manufacturing method, because rolling is not possible here. As a result, higher magnetic flux densities are achieved than with known electrical steel sheets and the performance of electric motors is significantly increased.

When the layers are built up during generative manufacturing, the layers are in a horizontal orientation in an advantageous method. Optionally, the generative manufacturing is followed by final processing steps, which can include thermal treatment and/or mechanical processing, for example grinding.

An electric motor according to the disclosure comprises at least one electric motor component according to the disclosure in the form of a rotor or stator. In particular, the electric motor is a synchronous motor or an asynchronous motor. Furthermore, it can be a linear motor, with the electric motor component being a rotor.

BRIEF DESCRIPTION OF THE DRAWINGS

In the following, several exemplary embodiments of the disclosure are explained in more detail by means of a drawing. In the figures.

DETAILED DESCRIPTION

Unless otherwise stated, the following explanations relate to all exemplary embodiments. Parts or parameters that correspond to each other or have basically the same effect are marked with the same reference symbols in all figures.

Figure 1:
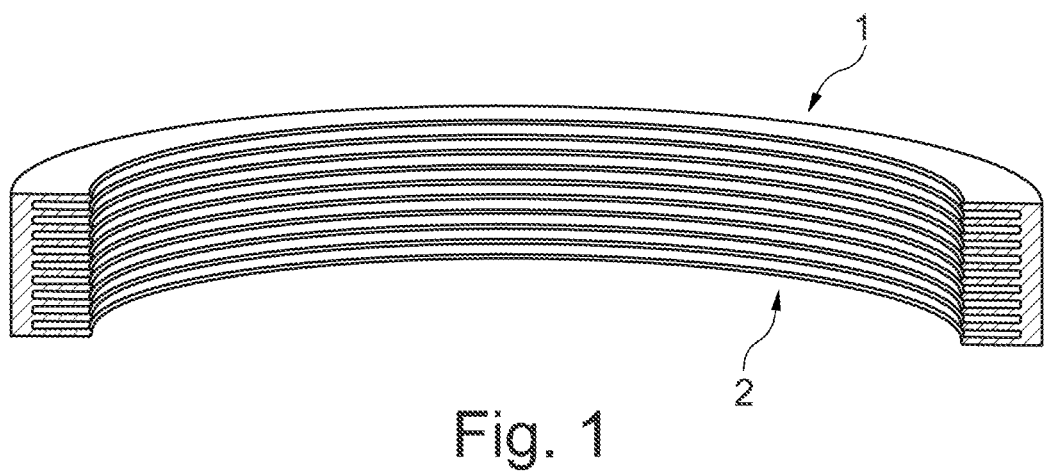
FIG. 1 shows a sectional view of an electric motor component.
Figure 2:
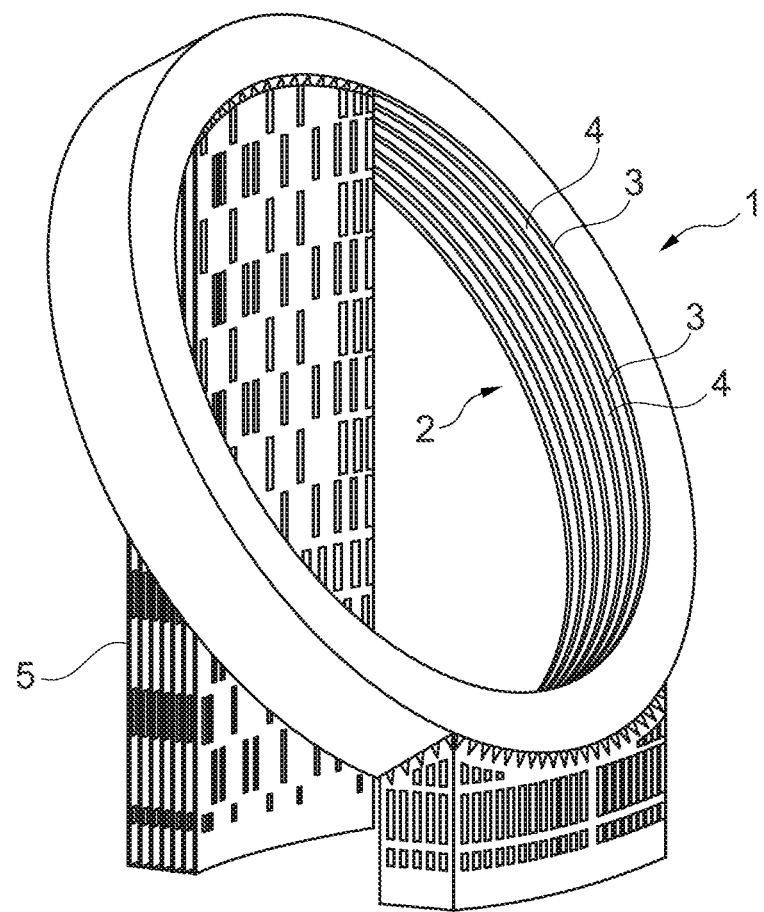
FIG. 2 shows the electric motor component in perspective view.

An electric motor component, denoted overall by 1, is part of a stator of an electric motor, not shown in any more detail. The electric motor component 1 has a layer assembly 2 which is formed from layers 3 of a first type and layers 4 of a second type. Within the finished electric motor component 1, the layers 3 of the first type are metallic layers and the layers 4 of the second type are ceramic layers. A support structure 5 that can be seen in FIG. 2 is of no importance as far as the function of the electric motor is concerned.

In the production of the layer assembly 2, the principles of the ADAM method are employed. In a first method step S1, a layer 3 of the first type is built up from a plastic/metal filament. Then, in step S2, a layer 4 of the second type is built up from a plastic/ceramic filament, i.e., applied to the previously produced layer 3 of the first type. The steps S1, S2 are repeated alternately until the layer assembly 2 is completed.

Figure 3:
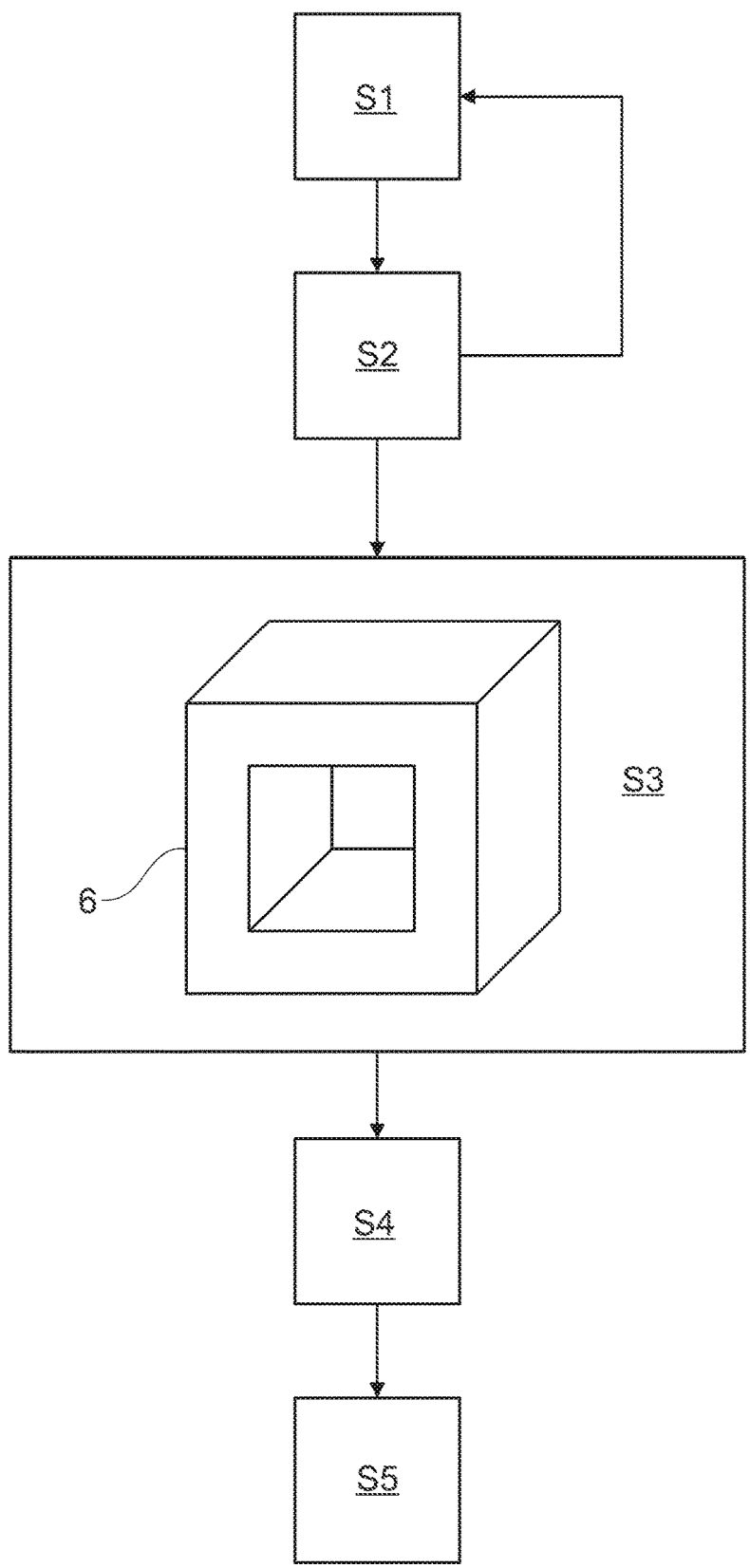
FIG. 3 shows in a flowchart basic features of a method for manufacturing the electric motor component.

A thermal treatment of the layer assembly 2 then takes place in step S3, which will be discussed in more detail below. A kiln is denoted by 6 in FIG. 3. After completion of the thermal treatment, the layer assembly 2 is post-processed in step S4, which can include surface processing. Step S5 marks the end of the method.

Figure 4:
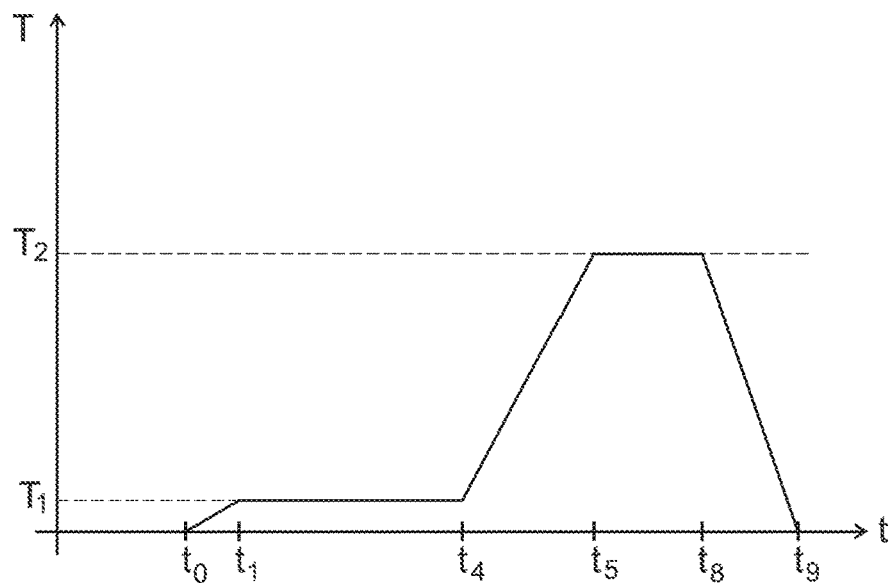
FIGS. 4 to 6 show different variants of the temperature control in the manufacture of the electric motor component.
Figure 5:
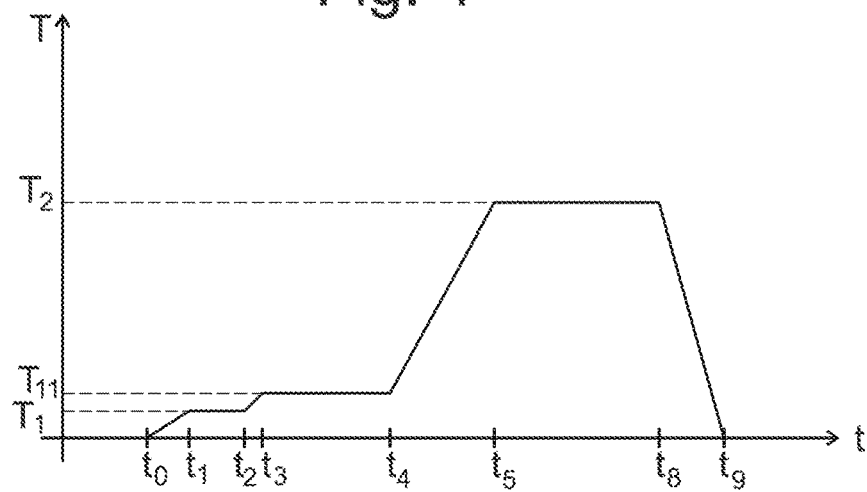
Figure 6:
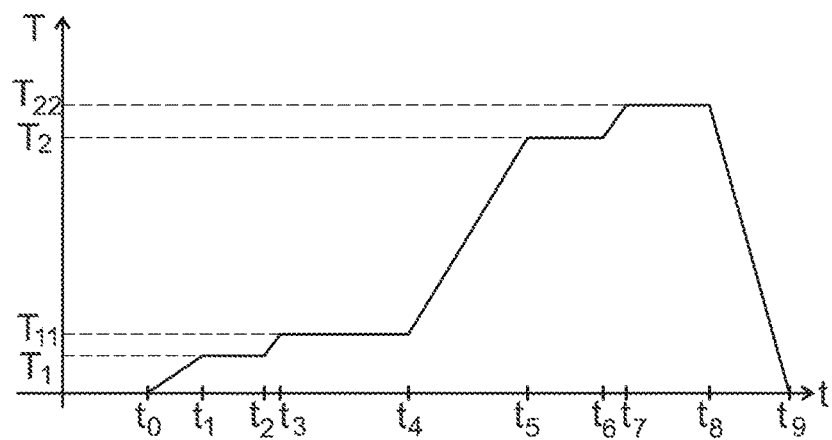

In FIGS. 4 to 6, three different variants of the temperature control in method step S3 are outlined. What all three variants have in common is that the temperature T of the workpiece, that of the layer assembly 2, is first raised to a first temperature level $T_1$, at which plastic components are removed. A significantly higher temperature level $T_2$, which is reached in all variants, causes a sintering process.

In the simplest variant illustrated in FIG. 4, the temperature level $T_1$ is maintained during the time period $t_1$ to $t_4$. In this case, the constant temperature level $T_2$ is maintained during the period $t_5$ to $t_8$.

In the method variant according to FIG. 5, the lower temperature level is split: The first temperature level $T_1$ is maintained only in the period $t_1$ to $t_2$. An intermediate temperature level $T_{11}$, which is substantially closer to the first temperature level $T_1$ than to the second temperature level $T_2$, is set in the time period $t_3$ to $t_4$. Overall, plastic components are removed from both layer types 3, 4 in the period $t_1$ to $t_4$, with the temperature levels $T_1$, $T_{11}$ being set in such a way that the plastic components are removed from the different layer types 3, 4 one after the other. As far as the thermal treatment at the second temperature level $T_2$ is concerned, there are no differences between the variant according to FIG. 4 and the variant according to FIG. 5.

The method variant according to FIG. 6 corresponds to the variant according to FIG. 5 with regard to the treatment at the temperature levels $T_1$, $T_{11}$. There are only differences at higher temperatures: After the second temperature level $T_2$ is kept constant from $t_5$ to $t_6$, the temperature T is set to an excessive temperature level $T_{22}$ in the time period $t_7$ to $t_8$. This splitting of the higher temperature level ensures that the sintering processes in the layer types 3, 4 take place one after the other in a defined manner.

With each of the method variants explained with reference to FIGS. 4 to 6, thicknesses of the layers 3, 4 of less than 0.15 mm, for example layer thicknesses of only 0.125 mm, can be realized.

LIST OF REFERENCE SYMBOLS

1 Component of an electric motor, electric motor component
2 Layer assembly
3 Layer of the first type, metal layer
4 Layer of the second type, ceramic layer
5 Support structure
6 Kiln
t Time
$t_0 \ldots t_9$ Points in time
T Temperature
$T_1$ First temperature level
$T_{11}$ Intermediate temperature level
$T_2$ Second temperature level
$T_{22}$ Excessive temperature level
S1 . . . S5 Method steps

The invention claimed is:

1. A method for producing a component of an electric motor, comprising:
    forming, via alternate additive production, a layer assembly including first layers and second layers, wherein each first layer includes a filament containing plastic and metal, and each second layer includes a filament containing plastic and ceramic,
    heating the layer assembly to a first temperature, at which the plastic is removed from the first layer, and
    further heating the layer assembly to a second temperature, at which the metal of the first layer is sintered;
    wherein, at the first temperature, the plastic remains in the second layer.

2. The method according to claim 1, further comprising, after heating the layer assembly to the first temperature and before heating the layer assembly to the second temperature, heating the layer assembly to an intermediate temperature, wherein the intermediate temperature is greater than the first temperature and less than the second temperature.

3. The method according to claim 2, wherein the intermediate temperature is closer to the first temperature than to the second temperature.

4. The method according to claim 2, wherein the plastic of the second layer is removed at the intermediate temperature.

5. The method according to claim 1, wherein, at the second temperature, an electrically insulating ceramic layer is obtained from the second layer.

6. The method according to claim 1, further comprising, after heating the layer assembly to the second temperature, heating the layer assembly to an elevated temperature, the elevated temperature being greater than the second temperature, wherein, at the elevated temperature, an electrically insulating ceramic layer is obtained from the second layer.

7. The method according to claim 1, wherein a thickness of the first layer and a thickness of the second layer is less than or equal to 0.15 mm.

8. The method according to claim 1, wherein the metal is formed by an iron alloy containing between 6.5% by weight and 10% by weight silicon and between 1% by weight and 5% by weight aluminum.

* * * * *